United States Patent
Fischer et al.

(10) Patent No.: US 12,242,053 B2
(45) Date of Patent: Mar. 4, 2025

(54) PROJECTION ASSEMBLY FOR A VEHICLE, COMPRISING A SIDE PANE

(71) Applicant: SAINT-GOBAIN GLASS FRANCE, Courbevoie (FR)

(72) Inventors: Klaus Fischer, Alsdorf (DE); Dagmar Schaefer, Herzogenrath (DE); Roberto Zimmermann, Solingen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1036 days.

(21) Appl. No.: 17/261,784

(22) PCT Filed: Oct. 9, 2019

(86) PCT No.: PCT/EP2019/077362
§ 371 (c)(1),
(2) Date: Jan. 20, 2021

(87) PCT Pub. No.: WO2020/083649
PCT Pub. Date: Apr. 30, 2020

(65) Prior Publication Data
US 2021/0325672 A1     Oct. 21, 2021

(30) Foreign Application Priority Data
Oct. 24, 2018  (EP) .................................. 18202219

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 5/3041* (2013.01);
(Continued)

(58) Field of Classification Search
CPC ........................ G02B 5/3041; G02B 27/0101; G02B 27/283; G02B 5/30; G02B 5/3025;
(Continued)

(56) References Cited

U.S. PATENT DOCUMENTS 2,562,895 A * 8/1951 Dreyer .................. F21S 41/135
359/488.01
5,999,314 A * 12/1999 Asakura ............ B32B 17/10761
359/485.02
(Continued)

FOREIGN PATENT DOCUMENTS

| CN | 1732404 A | 2/2006 |
|----|-----------|--------|
| CN | 104267498 A | 1/2015 |

(Continued)

OTHER PUBLICATIONS

International Search Report as issued in International Patent Application No. PCT/EP2019/077362, dated Dec. 5, 2019.

*Primary Examiner* — Ricky D Shafer
(74) *Attorney, Agent, or Firm* — Pillsbury Winthrop Shaw Pittman LLP

(57) ABSTRACT

A projection assembly for a vehicle, includes a vehicle side pane, which is equipped with a reflective coating, and a projector, which is directed at a region of the vehicle side pane, wherein the radiation of the projector is predominately p-polarized and wherein the reflective coating is suitable for reflecting p-polarized radiation. The projection assembly is provided for displaying entertainment content such as films for the rear vehicle occupants.

12 Claims, 3 Drawing Sheets

Figure 1:
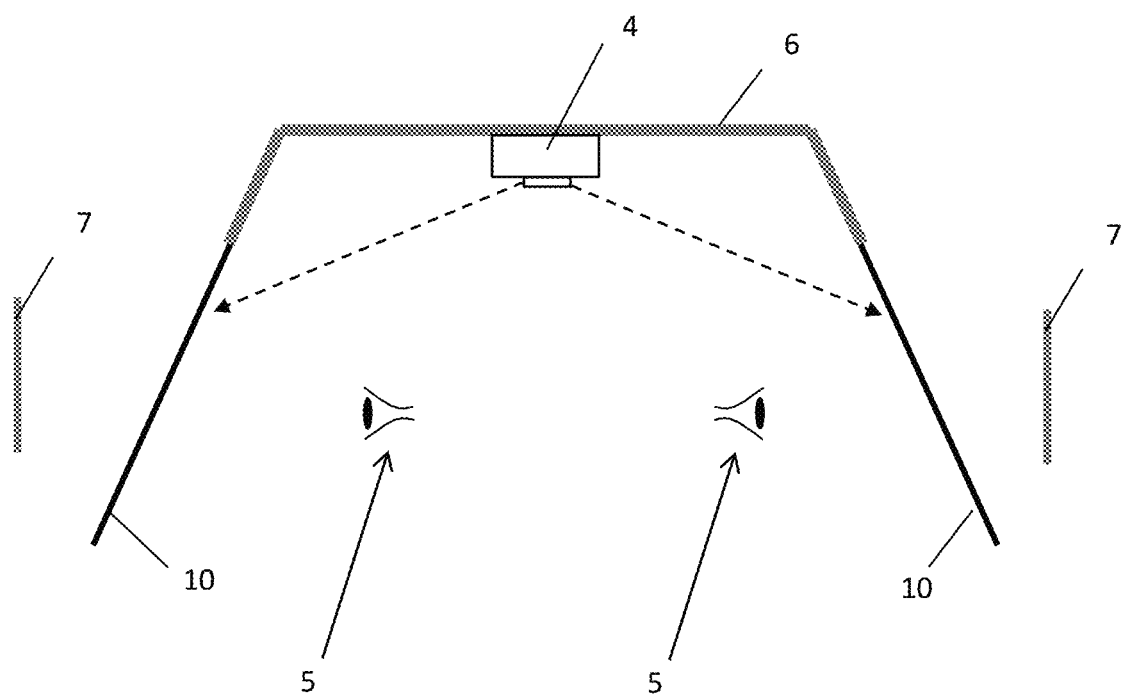

(51) Int. Cl.
*G02B 5/30* (2006.01)
*G02B 27/28* (2006.01)
*B60K 35/23* (2024.01)

(52) U.S. Cl.
CPC ............ *G02B 27/283* (2013.01); *B60K 35/23* (2024.01); *B60K 2360/23* (2024.01)

(58) Field of Classification Search
CPC .. G02B 5/08; B60K 35/00; B60K 2370/1529; B60K 2370/23
USPC .................................. 359/485.01; 353/13, 20
See application file for complete search history.

(56) References Cited

U.S. PATENT DOCUMENTS

| | | | |
|---|---|---|---|
| 6,137,630 A | | 10/2000 | Tsou et al. |
| 6,259,559 B1* | | 7/2001 | Kobayashi ............... G02B 5/30 |
| | | | 359/485.02 |
| 10,914,946 B2* | | 2/2021 | Fischer ............... C03C 17/3673 |
| 11,526,009 B2* | | 12/2022 | Fischer ............. B32B 17/10229 |
| 11,630,301 B2* | | 4/2023 | Wagner ............. B32B 17/10229 |
| | | | 359/630 |
| 11,914,144 B2* | | 2/2024 | Fischer ............... B32B 17/1077 |
| 2004/0135742 A1 | | 7/2004 | Weber et al. |
| 2006/0023315 A1 | | 2/2006 | Robinson |
| 2007/0020465 A1 | | 1/2007 | Thiel et al. |
| 2007/0082219 A1 | | 4/2007 | Fleury et al. |
| 2009/0153962 A1* | | 6/2009 | Okada ................ G02B 27/0101 |
| | | | 359/485.02 |
| 2009/0201589 A1* | | 8/2009 | Freeman ............ G02B 27/0103 |
| | | | 353/30 |
| 2012/0105808 A1* | | 5/2012 | Feng .................. G02B 27/0101 |
| | | | 353/20 |
| 2014/0168608 A1 | | 6/2014 | Disley |
| 2014/0313586 A1* | | 10/2014 | Jan ..................... G02B 27/0149 |
| | | | 359/630 |
| 2016/0272119 A1* | | 9/2016 | Ishiguro ................ H04N 9/3141 |
| 2017/0242247 A1* | | 8/2017 | Tso .................. B32B 17/10761 |
| 2018/0149867 A1 | | 5/2018 | Kremers et al. |
| 2022/0342217 A1* | | 10/2022 | Hagen ................. G02B 27/0018 |
| 2023/0271406 A1* | | 8/2023 | Hagen ............... B32B 17/10788 |
| | | | 428/336 |
| 2023/0280588 A1* | | 9/2023 | Diguet .................... C03C 17/36 |
| | | | 359/630 |

FOREIGN PATENT DOCUMENTS

| | | |
|---|---|---|
| CN | 104267499 A | 1/2015 |
| CN | 107015369 A | 8/2017 |
| DE | 10 2014 220189 A1 | 4/2016 |
| EP | 0 836 108 A2 | 4/1998 |
| EP | 1 880 243 A2 | 1/2008 |
| EP | 1 800 855 B1 | 2/2013 |
| EP | 3 187 917 A2 | 7/2017 |
| JP | H10-115802 A | 5/1998 |
| JP | 2006-512622 A | 4/2006 |
| JP | 2015-009766 A | 1/2015 |
| JP | 2017-090860 A | 5/2017 |
| JP | 2017-134248 A | 8/2017 |
| JP | 2017-538141 A | 12/2017 |
| JP | 2018-527631 A | 9/2018 |
| WO | WO 03/024155 A2 | 3/2003 |
| WO | WO 2005/017600 A1 | 2/2005 |
| WO | WO 2006/122305 A2 | 11/2006 |
| WO | WO 2009/071135 A1 | 6/2009 |
| WO | WO 2013/104438 A1 | 7/2013 |
| WO | WO 2013/104439 A1 | 7/2013 |

* cited by examiner

PROJECTION ASSEMBLY FOR A VEHICLE, COMPRISING A SIDE PANE

CROSS-REFERENCE TO RELATED APPLICATIONS

This application is the U.S. National Stage of PCT/EP2019/077362, filed Oct. 9, 2019, which in turn claims priority to European patent application number 18202219.4 filed Oct. 24, 2018. The content of these applications are incorporated herein by reference in their entireties.

The invention relates to a projection assembly for a vehicle, in particular provided as an entertainment system, and the use of a vehicle side pane for such a projection assembly.

Entertainment systems for motor vehicles are becoming increasingly widespread. It is common practice to provide the backs of the front seats with screens on which the rear occupants of the vehicle can, for example, watch films or play computer games.

Projection assemblies using window panes are common in the vehicle sector as so-called head-up displays (HUDs). In this case, images are projected onto the windshield with a projector, reflected there, and perceived by the driver as a virtual image behind the windshield (as viewed by him). Thus, important information can be projected into the driver's field of vision, for example, the current driving speed, navigation or warning instructions, which the driver can perceive without having to divert his glance from the road.

If the projectors use s-polarized radiation, this is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for windshields implemented as a composite pane such that the primary image and the ghost image are superimposed on one another. Composite glasses with wedge films for HUDs are known, for example, from WO2009/071135A1, EP1800855B1, or EP1880243A2.

Alternatively, projectors with p-polarized radiation can also be used. If the angle of incidence is close to Brewster's angle, p-polarized radiation is not reflected by the surfaces of the windowpane such that the problem of the ghost image is avoided. Instead, the windshields have a reflective coating by means of which the projection image is generated. Such an HUD is known, for example, from DE 10 2014 220 189 A1.

It is also known to provide vehicle windows with transparent, electrically conductive coatings. These coatings can act as IR-reflecting coatings to reduce the heating of the vehicle interior and thus to improve thermal comfort. However, the coatings can also be used as heatable coatings by connecting them to a voltage source such that a current flows through the coating.

Suitable coatings contain conductive, metallic layers, for example, based on silver or aluminum. These coatings can, in principle, be used to reflect p-polarized radiation in order to generate an HUD projection image. Since, for windshields, there are high legal requirements in terms of transparency, the electrically conductive coatings are implemented as complex thin-film stacks such that, in addition to the reflecting properties, in particular, in the IR range, high transmittance in the visible spectral range is ensured. Silver-containing transparent coatings are known, for example, from WO 03/024155, US 2007/0082219 A1, US 2007/0020465 A1, WO2013/104438, or WO2013/104439.

The object of the invention is to provide a projection assembly for a vehicle that can be used in particular as an entertainment system for the rear vehicle occupants. The projection assembly should be producible as economically as possible and produce an extraordinary impression on the viewer.

The object of the present invention is accomplished according to the invention by a projection assembly in accordance with claim 1. Preferred embodiments emerge from the dependent claims.

The projection assembly according to the invention for a vehicle comprises at least one vehicle side pane, which is equipped with a reflective coating, and a projector. The projector is arranged on the interior side of the side pane, is directed at a region of the side pane, and irradiates this region. The projector generates a virtual image perceivable behind the side pane. The projector uses p-polarized radiation that is not substantially reflected by the surfaces of the side pane if the angle of incidence is selected close to Brewster angle for an air-glass transition (57.2°, soda lime glass). Thus, double reflections can be avoided and the use of a wedge-like intermediate layer can be dispensed with, thus simplifying the production of the side pane and making it more economical. The reflective coating is designed to reflect the p-polarized radiation in order to generate the projection image. Since significantly lower or even no legal requirements are imposed on transparency, the coating does not have to ensure high transmittance in the visible spectral range. Consequently, simpler and less cost-intensive coatings can be used than, for example, in the case of windshields. The projection display as a virtual image behind the side pane gives the viewer an extraordinary entertainment experience. These are major advantages of the present invention.

The side pane according to the invention is provided, in a window opening of a vehicle, in particular a side window opening, to separate the interior from the external environment. The side pane is preferably a rear vehicle side pane (in particular of a motor vehicle, for example, a passenger car or a truck), i.e., a side pane, which is not associated with the driver or the front passenger, but rather with the rear occupants of the vehicle in the backseat. The side pane comprises two external surfaces (primary surfaces), which, in the context of the invention, are referred to as an "exterior-side surface" and an "interior-side surface" and a circumferential side edge extending therebetween. In the context of the invention, the "exterior-side surface" denotes that surface that is intended to face the external environment in the installed position. In the context of the invention, the "interior-side surface" denotes that primary surface that is intended to face the interior in the installed position.

The vehicle side pane can be implemented as a monolithic glass or plastic pane, in particular as thermally tempered single-plane safety glass (ESG). The reflective coating is then preferably applied to the interior-side surface, where it is exposed to lower mechanical and corrosive loads than on the exterior-side surface. In a preferred embodiment, the vehicle side pane is, however, designed as a composite pane. The composite pane comprises an outer pane and an inner pane that are joined to one another via a thermoplastic intermediate layer. In the context of the invention, "inner pane" denotes the pane of the composite pane facing the interior (in particular, the vehicle interior). "Outer pane" denotes the pane facing the external environment. The outer pane and the inner pane have in each case an exterior-side surface, an interior-side surface, and a circumferential side edge extending therebetween. The interior-side surface of the outer pane and the exterior-side surface of the inner pane face one another and are joined to one another by the thermoplastic intermediate layer.

When the side pane is designed as a composite pane, the reflective coating is preferably applied to one of the surfaces of the two panes facing the intermediate layer, i.e., to the interior-side surface of the outer pane or the exterior-side surface of the inner pane. Alternatively, the reflective coating can also be arranged within the thermoplastic intermediate layer, for example, applied to a carrier film that is arranged between two thermoplastic laminating films. Between the two panes, the reflective coating is protected against corrosion, mechanical damage, and other adverse effects. In particular, this is especially advantageous when the reflective coating includes one or a plurality of metal-containing, for example, silver-containing layers, which are susceptible to corrosion and, consequently, should not have any contact with the surrounding atmosphere.

Since the reflection of the projector radiation occurs substantially at the reflective coating and not at the external pane surfaces, it is not necessary to arrange the external pane surfaces at an angle relative to one another in order to avoid ghost images. The external surfaces of the side pane are, consequently, preferably arranged substantially parallel to one another. When the side pane is implemented as a composite pane, the thermoplastic intermediate layer is preferably not implemented wedge-like, but, instead, has a substantially constant thickness, just like the inner pane and the outer pane. A wedge-like intermediate layer would, in contrast, have a variable, in particular increasing thickness in the vertical course between the lower edge and the upper edge of the side pane. The intermediate layer is typically formed from at least one thermoplastic film. Since standard films are significantly more economical than wedge films, the production of the side pane is significantly more economical.

The radiation of the projector is predominately p-polarized. The angle of incidence of the projector radiation on the side pane is preferably from 45° to 70°. In a particularly advantageous embodiment, the angle of incidence deviates from Brewster's angle by at most 10°. The p-polarized radiation is then only insignificantly reflected at the surfaces of the side pane such that no ghost image is generated. The angle of incidence is the angle between the vector of incidence of the projector radiation and the interior-side surface normal (i.e., the surface normal on the interior-side external surface of the side pane) in the geometric center of the irradiated region of the side pane. Brewster's angle for an air-glass transition in the case of soda lime glass, which is commonly used for window panes, is 57.2°. Ideally, the angle of incidence should be as close as possible to this Brewster's angle. However, angles of incidence of 65°, which are common for HUD projection assemblies, are easily implemented in vehicles, and deviate only slightly from Brewster's angle can, for example, also be used such that the reflection of the p-polarized radiation increases only insignificantly.

The higher the proportion of the p-polarized radiation in the total radiation of the projector, the greater the intensity of the desired projection image, and the lower the intensity of the unwanted reflections at the surfaces of the side pane. The p-polarized share of the projector radiation is preferably at least 50%, particularly preferably at least 70%, most particularly preferably at least 80%, and in particular at least 90%. In a particularly advantageous embodiment, the radiation of the projector is essentially purely p-polarized—the p-polarized radiation component is thus 100% or deviates only insignificantly therefrom. The indication of the polarization direction refers to the plane of incidence of the radiation on the side pane. "P-polarized radiation" refers to radiation whose electrical field oscillates in the plane of incidence. "S-polarized radiation" refers to radiation whose electrical field oscillates perpendicular to the plane of incidence. The plane of incidence is spanned by the incidence vector and the surface normal of the side pane in the geometric center of the irradiated region.

According to the invention, the side pane is provided with a reflective coating that is suitable for reflecting p-polarized radiation. The side pane provided with the reflective coating preferably has, in the spectral range from 400 nm to 650 nm, which is of particular interest for the display of entertainment projectors, average reflectance relative to p-polarized radiation of at least 15%, particularly preferably of at least 20%, most particularly preferably of at least 25%. Thus, a projection image with sufficiently high intensity is generated. The reflectance is measured at an angle of incidence of 65° relative to the interior-side surface normal, which corresponds roughly to the irradiation by conventional projectors.

Reflectance describes the portion of the total irradiated radiation that is reflected. It is indicated as a percentage (based on 100% irradiated radiation) or as a unitless number from 0 to 1 (normalized to the incident radiation). Plotted against wavelength, it forms the reflection spectrum.

In order to achieve the most color neutral display of the projector image possible, the reflection effect should be as smooth as possible and have no pronounced local minima and maxima. Deviations at the edge of the spectral range of interest of 400 nm to 650 nm are less disturbing and can be accepted; however, in the spectral range from 450 nm to 600 nm, the difference between the maximum occurring reflectance and the mean value of the reflectance as well as the difference between the minimum occurring reflectance and the mean value of the reflectance in a preferred embodiment should be at most 7%, particularly preferably at most 3%, most particularly preferably at most 2.5%. Here again, the reflectance relative to p-polarized radiation measured with an angle of incidence of 65° relative to the interior-side surface normal is to be used. In a particularly advantageous embodiment, the above-mentioned preferred values apply to the spectral range from 420 nm to 600 nm, instead of only from 450 nm to 600 nm.

The data regarding the reflectance or the reflection spectrum are based on a reflection measurement with a light source that uniformly emits with a normalized radiation intensity of 100% in the spectral range under consideration.

Preferably, at least 80% of the pane surface is provided with the reflective coating according to the invention. In particular, the reflective coating is applied over the entire surface of the pane, optionally with the exception of a circumferential edge region and/or local regions which, as communication, sensor, or camera windows, ensure the transmission of electromagnetic radiation through the composite pane and, consequently, are not provided with the coating. The surrounding uncoated edge region has, for example, a width of up to 20 cm. It prevents direct contact of the coating with the surrounding atmosphere such that the coating is protected against corrosion and damage in the interior of the composite pane. An uncoated circumferential edge region and any communication windows are particularly useful when the reflective coating includes electrically conductive, metal-containing layers.

The reflective coating is preferably a thin-layer stack, i.e., a layer sequence of thin individual layers. The layer sequence preferably includes, alternatingly, layers with a high refractive index and a low refractive index. Through suitable choice of materials and layer thicknesses, the reflection behavior of such a layer sequence can be selectively adjusted as a result of interference effects. Thus, it is possible to realize a reflective coating with effective reflection relative to p-polarized radiation in the visible spectral range. The layers with a high refractive index (optically high-refractive layers) preferably have a refractive index greater than 1.8. The layers with a low refractive index (optically low-refractive layers) preferably have a refractive index less than 1.8. The uppermost and the lowest layer of the thin-layer stack are preferably optically high-refractive layers.

In one embodiment of the invention, all high- and low-refractive layers, in particular all layers of the reflective coating, are implemented as dielectric layers. The optically high-refractive layers are preferably based on silicon nitride, tin zinc oxide, silicon zirconium nitride, or titanium oxide, particularly preferably based on silicon nitride. The optically low-refractive layers are preferably based on silicon oxide. Other materials on which the optically high-refractive layers can be based are zirconium oxide, niobium oxide, hafnium oxide, tantalum oxide, tungsten oxide, silicon carbide, or diamond-like carbon (DLC). Other materials on which the optically low-refractive layers can be based are aluminum oxide, magnesium fluorite, silicon oxynitride, or calcium fluorite. The total number of high- and low-refractive layers is preferably from 8 to 15. Thus, a suitable design of the reflection properties is possible without making the layer structure too complex.

The layer thicknesses of the dielectric layers should preferably be from 30 nm to 500 nm, particularly preferably from 50 nm to 300 nm.

If a layer is based on a material, the layer is primarily made of this material along with any impurities or doping.

In a particularly advantageous embodiment, the reflective coating includes, in addition to the dielectric layers, at least one electrically conductive layer, in particular a metal-containing layer. Preferably, the reflective coating includes precisely one electrically conductive layer. It has been shown that such a conductive layer is suitable for smoothing the reflection spectrum of the reflective coating in the visible range such that a more color neutral display of the projector image is achieved. In addition, electrically conductive layers have a reflecting effect on IR-radiation such that thermal comfort is improved in that IR components of sunlight are reflected and, as a result, are less able to heat up the interior. The total number of high- and low-refractive layers is preferably from 5 to 10. A suitable design of the reflection properties is thus possible without making the layer structure too complex. The presence of the electrically conductive layer reduces the number of layers necessary to achieve a suitable design of the reflection properties.

The electrically conductive layer can be present in addition to the alternating, dielectric optically high- and low-refractive layers, for example, between a pair of adjacent optically high- and low-refractive layers or above or below the totality of the alternating optically high- and low-reactive layers. In a preferred embodiment, however, at least one, in particular precisely one, of the optically low-refractive layers is implemented as a metal-containing layer, while the remaining optically high- and low-refractive are implemented as dielectric layers. The conductive layer is then arranged between two optically high-refractive dielectric layers, without an optically low-refractive layer being arranged between the conductive layer and said high-reactive layers. The statements above apply with regard to the preferred materials and layer thicknesses of the dielectric layers.

The electrically conductive layer is preferably based on silver. The conductive layer preferably contains at least 90 wt.-% silver, particularly preferably at least 99 wt.-% silver, most particularly preferably at least 99.9 wt.-% silver. However, alternatively, other electrically conductive materials can also be provided, for example, gold, copper, or aluminum, or transparent conductive oxides (TCOs), such as indium tin oxide (ITO). Common conductive layers based on silver have a refractive index of approx. 0.015, are thus well suited as optically low-refractive layers. The layer thickness of the conductive layer is preferably from 5 nm to 20 nm, particularly preferably from 8 nm to 12 nm.

It is generally preferred that adjacent high- and low-refractive layers make direct contact with one another and that no additional layers are arranged therebetween.

In a particularly advantageous embodiment, with which good results are achieved, the reflective coating comprises the following layer sequence starting from the substrate on which the coating is deposited:
an optically high-refractive layer with a thickness of 80 nm to 100 nm, preferably of 92 nm to 95 nm,
an optically low-refractive layer with a thickness of 40 nm to 60 nm, preferably of 50 nm to 53 nm,
an optically high-refractive layer with a thickness of 120 nm to 140 nm, preferably of 126 nm to 129 nm,
an optically low-refractive layer with a thickness of 100 nm to 120 nm, preferably of 106 nm to 109 nm,
an optically high-refractive layer with a thickness of 60 nm to 80 nm, preferably of 67 nm to 70 nm,
an optically low-refractive layer with a thickness of 100 nm to 120 nm, preferably of 120 nm to 115 nm,
an optically high-refractive layer with a thickness of 60 nm to 80 nm, preferably of 68 nm to 71 nm,
an optically low-refractive layer with a thickness of 100 nm to 120 nm, preferably of 107 nm to 110 nm,
an optically high-refractive layer with a thickness of 30 nm to 50 nm, preferably of 40 nm to 43 nm,
an optically low-refractive layer with a thickness of 50 nm to 70 nm, preferably of 60 nm to 63 nm,
an optically high-refractive layer with a thickness of 200 nm to 220 nm, preferably of 211 nm to 214 nm.

The optically high-refractive layers have a refractive index greater than 1.8; the optically low-refractive layers, a refractive index less than 1.8. The reflective coating particularly preferably consists of the above-mentioned layers. The optically high-refractive and low-refractive layers are preferably dielectric layers. Preferred materials for the optically high-refractive layers are silicon nitride, tin zinc oxide, silicon zirconium nitride, zirconium oxide, niobium oxide, hafnium oxide, tantalum oxide, tungsten oxide, titanium oxide, silicon carbide, or diamond-like carbon (DLC). Preferred materials for the optically low-refractive layers are silicon oxide, aluminum oxide, magnesium fluorite, silicon oxynitride, or calcium fluorite. The optically high-refractive or low-refractive layers are, consequently, preferably based on these materials.

In a particularly advantageous embodiment, with which good results are achieved, the reflective coating comprises the following layer sequence starting from the substrate on which the coating is deposited:
an optically high-refractive layer based on silicon nitride, tin zinc oxide, silicon zirconium nitride, or titanium oxide, preferably silicon nitride, with a thickness of 80 nm to 100 nm, preferably of 92 nm to 95 nm, an optically low-refractive layer based on silicon dioxide with a thickness of 40 nm to 60 nm, preferably of 50 nm to 53 nm, an optically high-refractive layer based on silicon nitride, tin zinc oxide, silicon zirconium nitride, or titanium oxide, preferably silicon nitride, with a thickness of 120 nm to 140 nm, preferably of 126 nm to 129 nm, an optically low-refractive layer based on silicon dioxide with a thickness of 100 nm to 120 nm, preferably of 106 nm to 109 nm, an optically high-refractive layer based on silicon nitride, tin zinc oxide, silicon zirconium nitride, or titanium oxide, preferably silicon nitride, with a thickness of 60 nm to 80 nm, preferably of 67 nm to 70 nm, an optically low-refractive layer based on silicon dioxide with a thickness of 100 nm to 120 nm, preferably of 120 nm to 115 nm, an optically high-refractive layer based on silicon nitride, tin zinc oxide, silicon zirconium nitride, or titanium oxide, preferably silicon nitride, with a thickness of 60 nm to 80 nm, preferably of 68 nm to 71 nm, an optically low-refractive layer based on silicon dioxide with a thickness of 100 nm to 120 nm, preferably of 107 nm to 110 nm, an optically high-refractive layer based on silicon nitride, tin zinc oxide, silicon zirconium nitride, or titanium oxide, preferably silicon nitride, with a thickness of 30 nm to 50 nm, preferably of 40 nm to 43 nm, an optically low-refractive layer based on silicon dioxide with a thickness of 50 nm to 70 nm, preferably of 60 nm to 63 nm, an optically high-refractive layer based on silicon nitride, tin zinc oxide, silicon zirconium nitride, or titanium oxide, preferably silicon nitride, with a thickness of 200 nm to 220 nm, preferably of 211 nm to 214 nm. The reflective coating particularly preferably consists of the above-mentioned layers.

In a most particularly advantageous embodiment, with which particularly good results are achieved, the reflective coating comprises the following layer sequence starting from the substrate on which the coating is deposited:

an optically high-refractive layer with a thickness of 260 nm to 280 nm, preferably of 268 nm to 271 nm, an optically low-refractive layer with a thickness of 110 nm to 130 nm, preferably of 121 nm to 124 nm, an optically high-refractive layer with a thickness of 80 nm to 100 nm, preferably of 89 nm to 92 nm, a metal-containing optically low-refractive layer, in particular based on silver, with a thickness of 5 nm to 15 nm, preferably of 8 nm to 10 nm, an optically high-refractive layer with a thickness of 230 nm to 250 nm, preferably of 236 nm to 239 nm, an optically low-refractive layer with a thickness of 190 nm to 210 nm, preferably of 197 nm to 200 nm, an optically high-refractive layer with a thickness of 120 nm to 140 nm, preferably of 132 nm to 136 nm.

The optically high-refractive layers have a refractive index greater than 1.8; the optically low-refractive layers, a refractive index of less than 1.8. The reflective coating particularly preferably consists of the above-mentioned layers. The optically high-refractive and low-refractive layers are preferably dielectric layers, apart from the metal-containing optically low-refractive layer. Preferred materials for the optically high-refractive layers are silicon nitride, tin zinc oxide, silicon zirconium nitride, zirconium oxide, niobium oxide, hafnium oxide, tantalum oxide, tungsten oxide, titanium oxide, silicon carbide, or diamond-like carbon (DLC). Preferred materials for the dielectric optically low-refractive layers are silicon oxide, aluminum oxide, magnesium fluoride, silicon oxynitride, or calcium fluorite. The optically high-refractive or low-refractive layers are, consequently, preferably based on these materials.

In a most particularly advantageous embodiment, with which particularly good results are achieved, the reflective coating comprises the following layer sequence starting from the substrate on which the coating is deposited:

an optically high-refractive layer based on silicon nitride, tin zinc oxide, silicon zirconium nitride, or titanium oxide, preferably silicon nitride, with a thickness of 260 nm to 280 nm, preferably of 268 nm to 271 nm, an optically low-refractive layer based on silicon dioxide with a thickness of 110 nm to 130 nm, preferably of 121 nm to 124 nm, an optically high-refractive layer based on silicon nitride, tin zinc oxide, silicon zirconium nitride, or titanium oxide, preferably silicon nitride, with a thickness of 80 nm to 100 nm, preferably of 89 nm to 92 nm, a layer based on silver with a thickness of 5 nm to 15 nm, preferably of 8 nm to 10 nm, an optically high-refractive layer based on silicon nitride, tin zinc oxide, silicon zirconium nitride, or titanium oxide, preferably silicon nitride, with a thickness of 230 nm to 250 nm, preferably of 236 nm to 239 nm, an optically low-refractive layer based on silicon dioxide with a thickness of 190 nm to 210 nm, preferably of 197 nm to 200 nm, an optically high-refractive layer based on silicon nitride, tin zinc oxide, silicon zirconium nitride, or titanium oxide, preferably silicon nitride, with a thickness of 120 nm to 140 nm, preferably of 132 nm to 136 nm. The reflective coating particularly preferably consists of the above-mentioned layers.

When a first layer is arranged "above" a second layer, this means, in the context of the invention, that the first layer is arranged farther from the substrate on which the coating is applied than the second layer. When a first layer is arranged "below" a second layer, this means, in the context of the invention, that second layer is arranged farther from the substrate than the first layer. When a first layer is arranged "above" or "below" a second layer, this does not necessarily mean that the first and second player are situated in direct contact with one another. One or more other layers can be arranged between the first and the second layer provided this is not explicitly excluded.

The values indicated for the refractive indices are measured at a wavelength of 550 nm.

The side pane, or in the case of a composite pane, the outer pane and the inner pane, are preferably made of glass, in particular of soda lime glass, which is customary for window panes. The side pane, or its individual panes, can, however, in principle, also be made of other types of glass (for example, borosilicate glass, quartz glass, aluminosilicate glass) or transparent plastics (for example, polymethyl methacrylate or polycarbonate). The thickness of the side pane can vary widely. Preferably, in the case of a composite pane, individual panes with a thickness in the range from 0.8 mm to 5 mm, preferably from 1.4 mm to 2.5 mm are used, for example, those with the standard thicknesses 1.6 mm or 2.1 mm. In the case of a monolithic pane, thicknesses of 2 mm to 5 mm are customary.

The side pane, or some or all of its components, can be clear and colorless, but also tinted or colored. Non-tempered, partially tempered, or tempered glasses can be used. The side pane is preferably curved in one or a plurality of spatial directions, as is customary for motor vehicle windows, with typical radii of curvature in the range from approx. 10 cm to approx. 40 m. The side pane can, however, also be flat, for example, when it is intended as a pane for buses, trains, or tractors.

In the case of a composite pane, the thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The projector is preferably an LCD projector, in particular a TFT projector, an LED projector, or an OLED projector. The projector is, in particular, a film projector, i.e., a projector that is suitable for playing back films. The projector is particularly preferably implemented as a dual projector that is suitable for simultaneously irradiating the two opposite side panes.

The invention also includes a method for producing a projection assembly according to the invention, wherein a vehicle side pane is provided with a reflective coating that is suitable for reflecting p-polarized radiation, and, subsequently, a projector, whose radiation is predominately p-polarized, is directed at a region of the side pane in a defined relative arrangement. The above-described statements regarding preferred embodiments apply mutatis mutandis.

The reflective coating is preferably applied by physical vapor deposition (PVD), particularly preferably by cathodic sputtering ("sputtering"), most particularly preferably by magnetron-enhanced cathodic sputtering.

When the side pane is a composite pane, the reflective coating is applied to the inner pane or the outer pane, or, alternatively, provided on a carrier film. The outer pane and the inner pane are laminated to one another via the intermediate layer, for example, by autoclave methods, vacuum bag methods, vacuum ring methods, calender methods, vacuum laminators, or combinations thereof. Any carrier film with a reflective coating is inserted between two thermoplastic films of the intermediate layer. The bonding of the outer pane and the inner pane is usually done under the action of heat, vacuum, and/or pressure.

If the side pane is to be bent, it is preferably subjected to a bending process after any coating processes. In the case of a composite pane, the bending of the individual panes is preferably done prior to the lamination. Preferably, the outer pane and the inner pane are bent together congruently (i.e., at the same time and by the same tool), because, as a result, the shape of the panes is optimally matched to one another for the subsequent lamination. Typical temperatures for glass bending processes are, for example, 500° C. to 700° C.

The invention further includes the use of a vehicle side pane, which is equipped with a reflective coating that is suitable for reflecting p-polarized radiation, as a projection surface for a projector, whose radiation is predominately p-polarized. The projection assembly thus realized is preferably used for displaying entertainment content, in particular films, for the rear vehicle occupants. The above-described preferred embodiments apply mutatis mutandis. The projection assembly is preferably used in a motor vehicle, in particular a passenger car or truck, with the side pane being a rear side pane.

in the following, the invention is explained in detail with reference to drawings and exemplary embodiments. The drawings are a schematic representation and not to scale. The drawings in no way restrict the invention.

Figure 2:
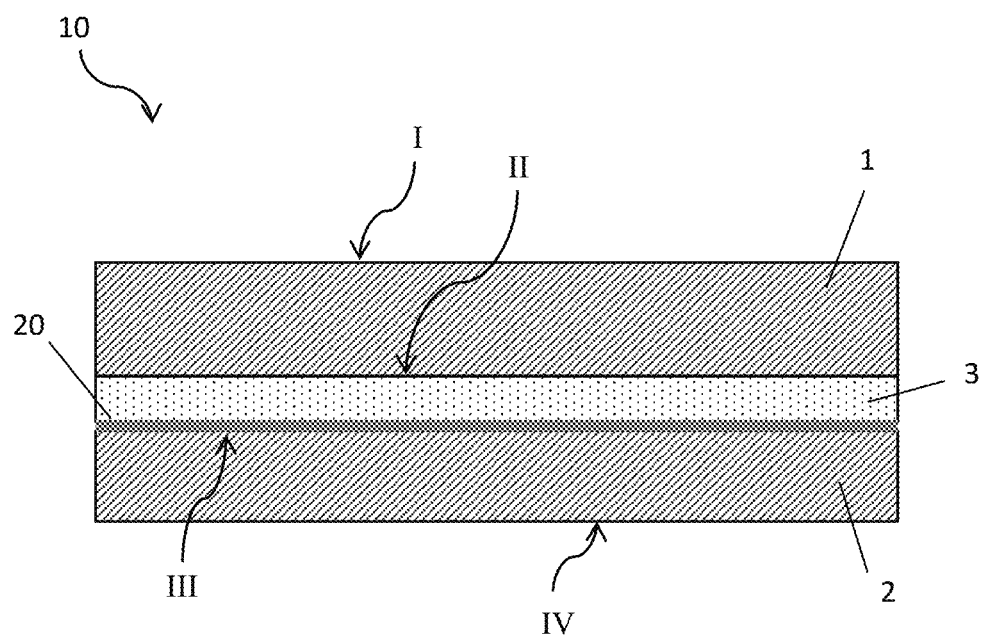
Figure 3:
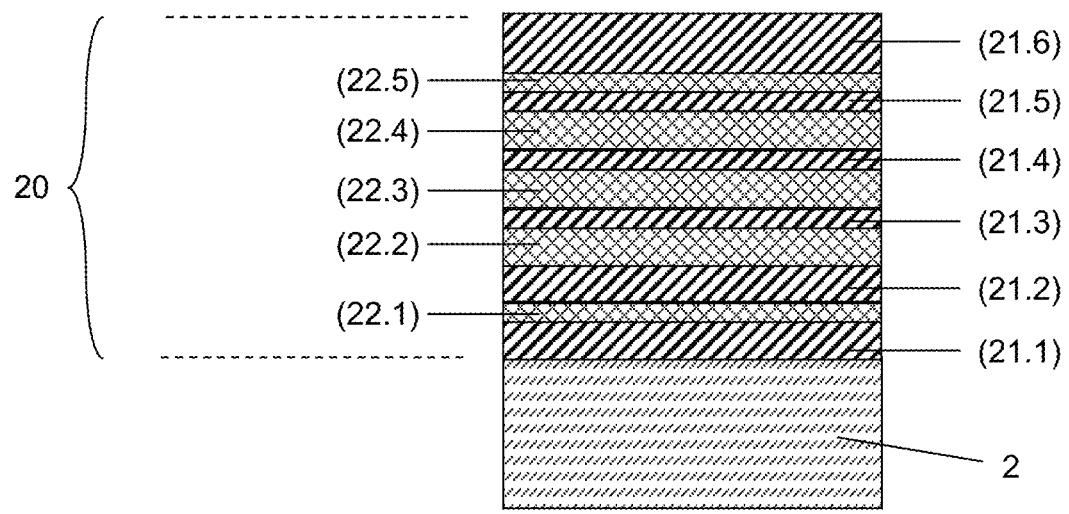
Figure 4:
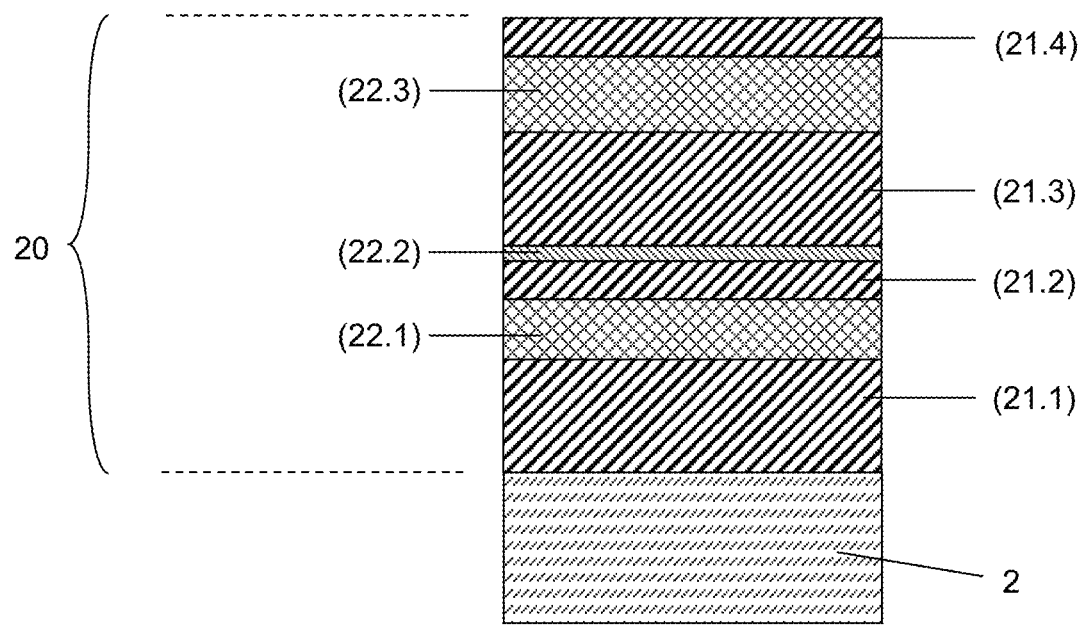
Figure 5:
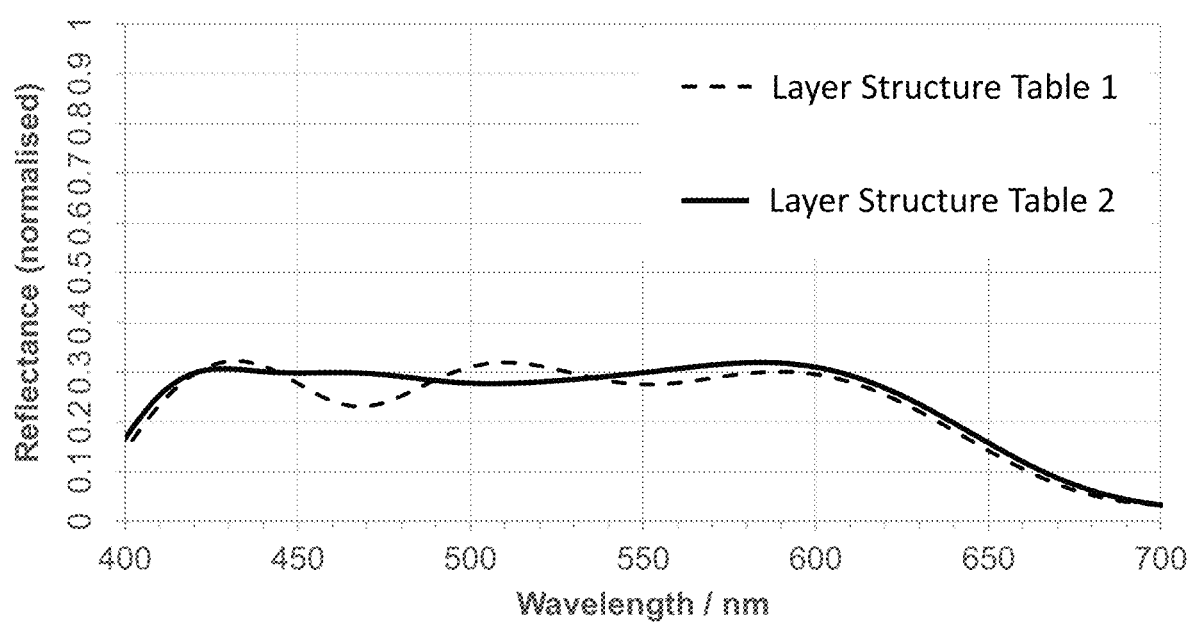

They depict:

FIG. 1 a schematic representation of an embodiment of the projection assembly according to the invention, FIG. 2 a cross-section through an embodiment of a vehicle side pane as a component of the projection assembly according to the invention, FIG. 3 a cross-section through a first embodiment of the reflective coating according to the invention, FIG. 4 a cross-section through a second embodiment of the reflective coating according to the invention, FIG. 5 reflection spectra of composite panes of composite panes that are equipped with the coatings of FIGS. 3 and 4.

FIG. 1 depicts, by way of example, a projection assembly according to the invention. The projection assembly comprises a projector 4, which is attached in the region of a vehicle roof 6. The projector is a dual film projector that emits p-polarized radiation (indicated by dashed arrows). The projection assembly further comprises the two rear side panes 10 of the vehicle, which serve as a projection surface for the projector 4. The side panes 10 are provided with a reflective coating (not shown specifically), which is suitable for reflecting the p-polarized radiation of the projector 4. By means of the reflection of the radiation of the projector 4 on the side panes 10, virtual images 7 are generated, which the viewers 5—the rear vehicle occupants—perceive on the sides of the side panes 10 facing away from them. A film, which appears, as it were, behind the panes in the surrounding landscape, can thus be displayed by the projector 4.

The projector 4 irradiates the side panes 10 with an angle of incidence of, for example, approx. 65°, which is close to Brewster's angle. Consequently, the p-polarized radiation is hardly reflected by the external pane surfaces. Instead, the reflection occurs almost exclusively on the reflective coating as the only reflection surface. Ghost images, such as would be caused by the use of s-polarized radiation by the reflection on both external surfaces of the side pane 10, can thus be avoided.

FIG. 2 depicts the structure of an embodiment of the vehicle side pane 10. The side pane 10 is implemented as a composite pane and is composed of an outer pane 1 and an inner pane 2, which are joined to one another via a thermoplastic intermediate layer 3. In the installed position, the outer pane 1 faces the external environment; the inner pane 2, the vehicle interior. The outer pane 1 has an exterior-side surface I, which, in the installed position, faces the external environment; and an interior-side surface II, which, in the installed position, faces the interior. Likewise, the inner pane 2 has an exterior-side surface III, which, in the installed position, faces the external environment; and an interior-side surface IV, which, in the installed position, faces the interior. Applied on the exterior-side surface III of the inner pane 2 is a reflective coating 20 that is suitable for reflecting p-polarized radiation. The outer pane 1 and the inner pane 2 are made, for example, of soda lime glass. The outer pane 1 has, for example, a thickness of 2.1 mm; the inner pane 2, a thickness of 1.6 mm. The intermediate layer 3 is, for example, formed from a PVB-film with a thickness of 0.76 mm.

FIG. 3 depicts the layer sequence of an advantageous embodiment of the reflective coating 20 according to the invention. The coating 20 is a stack of thin layers, wherein a total of six dielectric, optically high-refractive layers 21 (21.1, 21.2, 21.3, 21.4, 21.5, 21.6) and five dielectric, optically low-refractive layers 22 (22.1, 22.2, 22.3, 22.4, 22.5) are deposited alternatingly on the substrate (inner pane 2). The optically high-refractive layers 21.1, 21.2, 21.3, 21.4, 21.5, 21.6 are based on silicon nitride (SiN) with a refractive index of 2.04. The optically low-refractive layers 22.1, 22.2, 22.3, 22.4, 22.5 are based on silicon oxide (SiO) with a refractive index of 1.47.

The layer sequence is shown schematically in the figure. The layer sequence of a side pane 10 implemented as a composite pane with the coating 20 on the exterior-side surface III of the inner pane 2 is also presented in Table 1, together with the materials and layer thicknesses of the individual layers.

TABLE 1

| Material | Reference character | | Layer thickness |
|---|---|---|---|
| Soda lime glass | 1 | | 2.1 mm |
| PVB | 3 | | 0.76 mm |
| SiN | 20 | 21.6 | 212.8 nm |
| SiO | | 22.5 | 61.8 nm |
| SiN | | 21.5 | 41.7 nm |
| SiO | | 22.4 | 108.8 nm |
| SiN | | 21.4 | 69.7 nm |
| SiO | | 22.3 | 113.2 nm |
| SiN | | 21.3 | 68.6 nm |
| SiO | | 22.2 | 107.4 nm |
| SiN | | 21.2 | 127.4 nm |
| SiO | | 22.1 | 51.3 nm |
| SiN | | 21.1 | 93.1 nm |
| Soda lime glass | 2 | | 1.6 mm |

FIG. 4 depicts the layer sequence of another advantageous embodiment of the reflective coating 20 according to the invention. The coating 20 is a stack of thin layers, wherein a total of four dielectric, optically high-refractive layers 21 (21.1, 21.2, 21.3, 21.4) and three optically low-refractive layers 22 (22.1, 22.2, 22.3) are deposited, alternatingly, on the substrate (inner pane 2). Here, as well, the optically high-refractive layers 21.1, 21.2, 21.3, 21.4 are based on silicon nitride (SiN). The middle optically low-refractive layer 22.2 is implemented as an electrically conductive layer based on silver (Ag), while the remaining optically low-refractive layers 22.1, 22.3 are dielectric layers based on silicon oxide (SiO).

The layer sequence is shown schematically in the figure. The layer sequence of a side pane 10 implemented as a composite pane with the coating 20 on the exterior-side surface III of the inner pane 2 is also presented in Table 2, together with the materials and layer thicknesses of the individual layers.

TABLE 2

| Material | Reference character | | Layer thickness |
|---|---|---|---|
| Soda lime glass | 1 | | 2.1 mm |
| PVB | 3 | | 0.76 mm |
| SiN | 20 | 21.4 | 134.0 nm |
| SiO | | 22.3 | 198.1 nm |
| SiN | | 21.3 | 237.8 nm |
| Ag | | 22.2 | 9.1 nm |
| SiN | | 21.2 | 90.4 nm |
| SiO | | 22.1 | 122.1 nm |
| SiN | | 21.1 | 269.7 nm |
| Soda lime glass | 2 | | 1.6 mm |

FIG. 5 depicts reflection spectra of a composite pane 10 as in FIG. 2, in each case with a layer structure in accordance with Table 1 and Table 2. The reflection spectrum was recorded with a light source that emits p-polarized radiation of uniform intensity in the spectral range considered, with irradiation via the inner pane (the so-called "interior-side reflection") at an angle of incidence of 65° relative to the interior-side surface normal. The reflection measurement thus approximates the situation in the projection assembly.

The purely dielectric layer structure in accordance with Table 1 results, in the spectral range from 400 nm to 650 nm, in an average reflectance of 27%; the layer structure with the silver layer in accordance with Table 2, in an average reflectance of 27%. Thus, both reflective coatings 20 are suitable, in the spectral range of typical film projectors, for effectively reflecting their p-polarized radiation and, consequently, for generating the desired projection image.

It is discernible that the silver layer of the reflective coating in accordance with Table 2 results in a significant smoothing of the reflection spectrum. In the spectral range from 450 nm to 600 nm, the mean value for the dielectric layer structure in accordance with Table 1 is 28%; the minimum, 23% and the maximum, 32%. The difference between the maximum occurring reflectance and the mean value is thus 4%; the difference between the minimum occurring reflectance and the mean value, 5%. In contrast, the mean value for the layer structure in accordance with Table 2 is 30%; the minimum, 28% and the maximum, 32%.% [sic]. The difference between the maximum occurring reflectance and the mean value is thus 2%; the difference between the minimum occurring reflectance and the mean value is likewise 2%. In the spectral range from 420 nm to 600 nm, the mean value for the dielectric layer structure in accordance with Table 1 is 29%; the minimum, 23% and the maximum, 32%. The difference between the maximum occurring reflectance and the mean value is thus 3%; the difference between the minimum occurring reflectance and the mean value, 6%. In contrast, the mean value for the layer structure in accordance with Table 2 is 30%; the minimum, 28% and the maximum, 32%.% [sic]. The difference between the maximum occurring reflectance and the mean value is thus 2%; the difference between the minimum occurring reflectance and the mean value is likewise 2%. The smoothing of the reflections by the silver layer results in more color neutral reproduction of the projector image.

Table 3 indicates some optical values of coated side panes that are familiar to the person skilled in the art and are customarily used to characterize vehicle windows. Here, RL stands for the integrated light reflection and TL for the integrated light transmittance (per ISO 9050). The information after RL or TL indicates the light source used, A representing the light source A and HUD representing an HUD projector with radiation wavelengths of 473 nm, 550 nm, and 630 nm (RGB), used here as an exemplary model for a film projector. The angle specification after the light type indicates the angle of incidence of the radiation relative to the exterior-side surface normal. Angles of incidence less than 90° therefore indicate exterior-side irradiation; and angles of incidence greater than 90°, interior-side irradiation. The specified angle of incidence of 115° corresponds to an angle of incidence relative to the interior-side surface normal of 65°(=180°−115°) and simulates the irradiation with the projector according to the invention. When determining the integral reflection values RL, the observation angle is 2°. In each case, below the reflection values are the associated color values a* and b* in the L*a*b* color space, followed by the indication of the light source used (light source D65 and HUD projector) and the indication of the observation angle (angle at which the light beam in the eye strikes the retina).

TTS ISO 13837 represents the total irradiated solar energy, measured per ISO 13837, and is a measure of thermal comfort.

The panes have relatively low light transmittance and a distinct color cast with exterior-side reflection. This plays a subordinate role in the case of rear side panes because, here, the requirements for transmittance and color neutrality are less pronounced than in the case of windshields and front side panes. For the projector image displayed (RL HUD p-pol. 115°), good reflection values and good color neutrality are achieved. The TTS value is advantageously low for both coatings, with a further reduction in the irradiated solar energy being achievable with the layer structure according to Table 2 as a result of the silver layer, despite a lower total number of layers.

TABLE 3

|  | Layer Structure Table 1 | Layer Structure Table 2 |
| --- | --- | --- |
| RL A 8°/% | 58.3 | 40.2 |
| a* (D65/10°) | −5.6 | −15.9 |
| b* (D65/10°) | 36.4 | 22.3 |
| RL A 60°/% | 53.5 | 43.0 |
| a* (D65/10°) | −4.2 | 0.4 |
| b* (D65/10°) | 3.1 | −0.5 |
| RL HUD p-pol. 115°/% | 28.7 | 29.7 |
| a* (HUD/10°) | −3.5 | −0.4 |
| b* (HUD/10°) | 1.5 | −0.1 |
| TL A 0°/% | 38.7 | 56.1 |
| TTS ISO 13837/% | 57.3 | 55.7 |

LIST OF REFERENCE CHARACTERS

(10) vehicle side pane
(1) outer pane
(2) inner pane
(3) thermoplastic intermediate layer
(4) projector
(5) viewer
(6) vehicle roof
(7) virtual image
(20) reflective coating
(21) optically high-refractive layer
(21.1), (21.2), (21.3), (21.4), (21.5), (21.6) 1st, 2nd, 3rd, 4th, 5th, 6th optically high-refractive layer
(22) optically low-refractive layer
(22.1), (22.2), (22.3), (22.4), (22.5) 1st, 2nd, 3rd, 4th, 5th optically low-refractive layer
(I) exterior-side surface of the outer pane 1 facing away from the intermediate layer 3
(II) interior-side surface of the outer pane 1 facing the intermediate layer 3
(III) exterior-side surface of the inner pane 2 facing the intermediate layer 3
(IV) interior-side surface of the inner pane 2 facing away from the intermediate layer 3

The invention claimed is:

1. A projection assembly for a vehicle, comprising:
a vehicle side pane, which is equipped with a reflective coating, and
a projector, which is directed at a region of the vehicle side pane,
wherein a radiation of the projector is predominately p-polarized, wherein the reflective coating is suitable for reflecting p-polarized radiation, and wherein the vehicle side pane with the reflective coating has, in a spectral range from 400 nm to 650 nm, an average reflectance relative to p-polarized radiation of at least 15%,
wherein the reflective coating includes, alternatingly, optically high-refractive layers with a refractive index greater than 1.8 and optically low-refractive layers with a refractive index less than 1.8, and
wherein at least one of the optically low-refractive layers is implemented as an electrically conductive layer, while the optically high-refractive layers and the remaining optically low-refractive layers are implemented as dielectric layers,
wherein the reflective coating comprises the following layers:
a first optically high-refractive layer based on silicon nitride, tin zinc oxide, silicon zirconium nitride, or titanium oxide with a thickness of 260 nm to 280 nm,
above that, a first optically low-refractive layer based on silicon dioxide with a thickness of 110 nm to 130 nm,
above that, a second optically high-refractive layer based on silicon nitride, tin zinc oxide, silicon zirconium nitride, or titanium oxide, with a thickness of 80 nm to 100 nm,
above that, a second optically low-refractive layer based on silver with a thickness of 5 nm to 15 nm,
above that, a third optically high-refractive layer based on silicon nitride, tin zinc oxide, silicon zirconium nitride, or titanium oxide, with a thickness of 230 nm to 250 nm,
above that, a third optically low-refractive layer based on silicon dioxide with a thickness of 190 nm to 210 nm,
above that, a fourth optically high-refractive layer based on silicon nitride, tin zinc oxide, silicon zirconium nitride, or titanium oxide, with a thickness of 120 nm to 140 nm.

2. The projection assembly according to claim 1, wherein, in the spectral range from 450 nm to 600 nm, a difference between a maximum occurring reflectance and a mean value and a difference between a minimum occurring reflectance and the mean value is at most 3%.

3. The projection assembly according to claim 1, wherein the radiation of the projector is essentially purely p-polarized.

4. The projection assembly according to claim 1, wherein the radiation of the projector strikes the vehicle side pane with an angle of incidence of 45° to 70°.

5. The projection assembly according to claim 1, wherein the vehicle side pane is designed as a composite pane, comprising an outer pane and an inner pane that are joined to one another via a thermoplastic intermediate layer, and wherein the reflective coating is arranged on the surface of the outer pane or of the inner pane facing the intermediate layer or within the intermediate layer.

6. The projection assembly according to claim 5, wherein the external surfaces of the vehicle side pane are arranged substantially parallel to one another.

7. The projection assembly according to claim 1, wherein the vehicle side pane with the reflective coating has, in the spectral range from 400 nm to 650 nm, average reflectance relative to p-polarized radiation of at least 20%.

8. The projection assembly according to claim 1, wherein the thickness of the first optically high-refractive layer is from 268 nm to 271 nm.

9. The projection assembly according to claim 1, wherein the thickness of the first optically low-refractive layer based on silicon dioxide with a thickness of 121 nm to 124 nm.

10. The projection assembly according to claim 1, wherein the thickness of the second optically high-refractive layer is from 89 nm to 92 nm.

11. The projection assembly according to claim 1, wherein the thickness of the second optically low-refractive layer based on silver is from 8 nm to 10 nm.

12. The projection assembly according to claim 1, wherein the projector is mounted on a roof of a vehicle and is configured to project light to a plurality of vehicle side panes of the vehicle so as to form a virtual image for each of said plurality of vehicle side panes.

\* \* \* \* \*